INVENTOR.
Allan H. Newbury
BY
Murray A. Gleeson
ATTORNEY

April 22, 1958     A. H. NEWBURY     2,831,567
ROPE SIDE-FRAME CONVEYOR WITH NON-WALKING SUPPORTING STAND
Original Filed March 23, 1956     2 Sheets-Sheet 2

INVENTOR.
Allan H. Newbury
BY
Murray A. Gleeson
ATTORNEY

United States Patent Office 2,831,567
Patented Apr. 22, 1958

2,831,567

ROPE SIDE-FRAME CONVEYOR WITH NON-WALKING SUPPORTING STAND

Allan H. Newbury, Oak Hill, W. Va., assignor to Goodman Manufacturing Company, Chicago, Ill., a corporation of Illinois Continuation of application Serial No. 573,553, March 23, 1956. This application December 12, 1957, Serial No. 703,474

11 Claims. (Cl. 198—192)

This invention relates generally to conveyors and particularly to an improved ground supported stand for a rope side frame belt conveyor.

Generally, by way of identification, a rope side frame conveyor is disclosed in Craggs and McCann applications Serial Number 521,355, filed July 11, 1955, now abandoned and Serial Number 600,418, filed July 27, 1956 as a continuation of the former application and now Patent Number 2,773,257. Briefly, it comprises a pair of transversely spaced flexible strands, such as wire ropes, trained along parallel courses and held at a suitable spacing above the ground by supporting stands. Vertically articulated troughing roller assemblies are supported across the ropes and the load carrying reach of the belt runs along the roller assemblies. The return reach of the belt is carried on idlers which may also be supported by the stands.

I have found that under certain conditions in which the load comes on and goes off frequently, or varies in intensity, the ropes shift in a forward and backward direction, carrying the supporting stands with them. This movement is not always the same on both sides of the stands, hence they tend to become slued and even shift sidewise to throw the ropes out of line and untrain the belt. Sometimes this forward and backward movement is sufficient even to tip the stands over entirely.

Accordingly it is an object of the present invention to provide a frictionless support for the wire rope, such as a rotatable sheave or a hardened curved shoe, for example but without limitation thereto, between the supporting stand and the wire ropes so the latter can shift back and forth freely without moving the stand.

Another object of this invention is the provision of a foot on the bottom of the stand which is of sufficiently large dimension, as measured parallel to the ropes, to keep the stand from tipping over because of shifting of the ropes.

Further objects and advantages will be seen from the following description in which.

Like parts are designated by like reference characters throughout the figures of the drawing.

Figure 1:
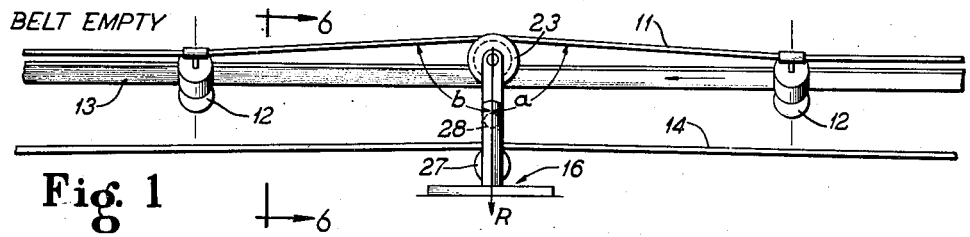
Figure 1 is a side view of an intermediate section of a rope side frame belt conveyor, which for the sake of example may be considered as being located at the middle of the conveyor, showing a supporting stand employing one form of anti-friction connection with the rope side frames, Figure 1 showing the belt unloaded and moving from the right to the left.

This application is a continuation of my co-pending application Serial No. 573,553, filed March 23, 1956, now abandoned.

Referring first to the details of the embodiment shown in Figures 1 through 6, the side frames of the conveyor comprise two flexible strands 11, 11, in this case a pair of wire ropes, trained, taut, in transversely spaced generally parallel courses. Spanning the ropes at intervals are vertically articulated troughing roller assemblies 12 which support the upper, load-carrying run 13 of a conveyor belt. The lower run is designated 14. Since the detailed construction of the roller assemblies 12 forms no part of the present invention, it will not be described here, but a full disclosure may be had by reference to the above-mentioned Craggs and McCann patent.

At intervals along the rope side frames 11, 11, there are positioned a plurality of supporting members or stands 16, only one being shown in the drawing, and this, for convenience in description, is regarded as being located at the center of the conveyor, that is half-way between the head and tail ends. The supporting members or stands 16 maintain the rope side frames 11, 11 at a predetermined spacing above the ground and the spacing between stands 16 will vary depending on the service conditions, primarily the maximum load, and will be spaced close enough together to keep the catenary droop of the rope frame 11 within reasonable limits. By way of example, for a thirty-inch wide belt carrying coal at 500 feet per minute, the stands may be located approximately twenty feet apart.

Figure 6:
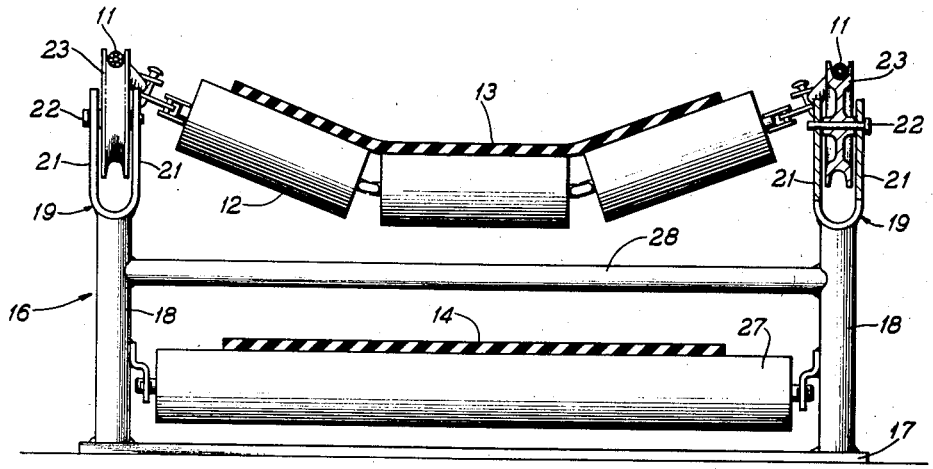
Figure 6 is a cross sectional view of Figure 1 taken along the line 6—6 and shows a portion of the stand at the right in cross-section.

As best shown in Figure 6, the stand 16 comprises a ground-engaging foot 17, a pair of upstanding legs 18, 18, each terminating in an upwardly-open yoke or bifurcation 19 having a pair of vertical arms 21, 21 supporting a transverse shaft 22. Each of the latter shafts supports a mounting, supporting or guiding device, such as a rotatable sheave 23, which carries one of the ropes 11.

Thus, since the sheaves 23, 23 comprises an anti-friction mounting, supporting, guiding or connecting means between the supporting stand and the wire rope side frames, it will be obvious that the ropes can shift freely over the sheaves in a longitudinal direction without moving the stand, or tipping it.

As shown in Figure 6, the foot 17, in the embodiment shown, is welded to and extends between the bottom ends of the legs 18, 18, thereby functioning as a spacer to hold the sheaves 23, 23, and the ropes 11, 11, a determined distance apart. As also shown in Fig. 6, a transverse spacer strut 28 likewise extends between the legs 18, 18 to stabilize and strengthen the construction.

When the conveyor is of considerable length, say, 500 feet or more, and is intermittently loaded, or the load on it varies, as for example where the conveyor is used to take away the output of a mining operation, there are times when the forces exerted by the rope on the stand will have a resultant component tending to tip it over. To prevent this happening, the width W (Fig. 2) of the foot (that is in a direction measured longitudinally of the conveyor) must be sufficient that the line of action of the resultant R of the forces exerted by the rope will pass through the foot and not beyond it. The line of action of the resultant R may be determined simply by bisecting the angle of the rope as it passes over the sheaves 23 and extending the bisection line downward. For some purposes, it is convenient to consider the two lines of action on both sheaves as being in a plane of action. Stating this line of action in another way, it may be determined by equalizing the angles "a" and "b" (see Figs. 1, 2 and 5).

Figure 7:
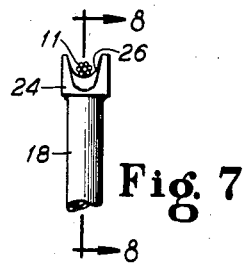
Figure 7 is an alternate form of frictionless connection.
Figure 8:
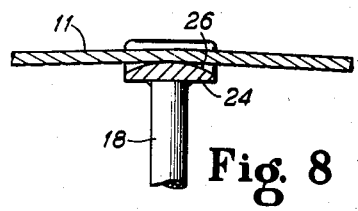
Figure 8 is a cross sectional view of Figure 7 taken along the line 8—8.

The anti-friction connection or mounting device need not necessarily be a rotatable sheave. As shown in the modified form in Figures 7 and 8, the yoke 19 and sheave 23 atop each leg 18 may be substituted simply by an upwardly-open, U-cross-section hardened shoe 24, having a strand-engaging lower surface portion 26 which is preferably upwardly convex in shape to present substantially a point contact with the rope. For all practical purposes, this comprises an anti-friction connection between the stand and the ropes.

The anti-friction connection or mounting device contemplated by this invention may be any suitable arrangement in which the friction between each rope and its respective support is sufficiently low that longitudinal movement of the rope relative to the support will not pull the support over.

The use and operation of the invention will now be described.

Assume the stand shown in the figures to be half-way between the inby and outby ends of the conveyor, which are respectively right- and left-hand in the drawings. Assume further that the conveyor is used to carry away the output from a mining operation and will vary between fully loaded and empty conditions while running continuously.

If the belt is empty, it will assume the symmetrical condition shown in Figure 1, whether running or still. In that case, note that the resultant R is exerted straight downward through its leg 18, and therefore has no component tending to tip the stand.

Figure 2:
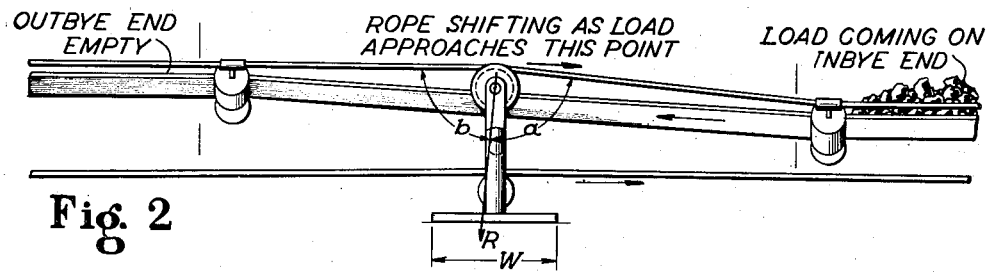
Figure 2 is a view similar to Figure 1 but showing the belt moving and with a load coming on from the inby end at the right.

Now, assume a miner begins to load the inby (right-hand) end of the belt. It will be apparent that the loaded portion of the belt will sag on the ropes more than the empty portion. Thus, as the inby end is progressively loaded, the rope will shift to the right. The maximum rightwise shift relative to the stand 16 is shown in Figure 2, which pictures the instant that the load reaches the stand. At that time the entire belt inby of the stand is fully loaded, and the entire outby portion is empty. Under this condition, R is as far as it will ever go to the left, but still intersect the foot 17 well within the dimension W so it represents a condition of stability.

Figure 3:
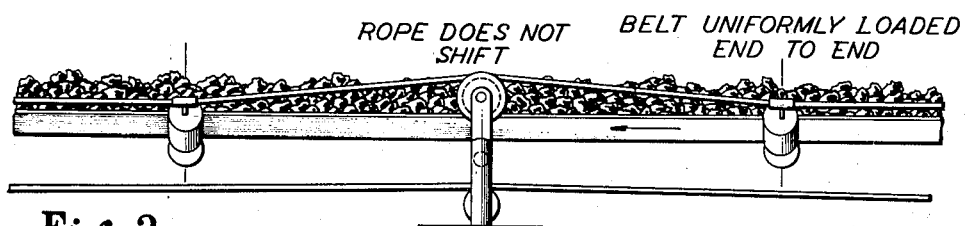
Figure 3 is a view similar to Figure 2 showing the condition where the belt is fully loaded end to end.

Assume now that the miner continues to load the inby end of the belt. As the incoming end of the load passes over the stand 16, the rope begins to shift to the left until the belt is uniformly loaded from end to end. At that time the rope stops shifting and the symmetrical, fully loaded condition of Figure 3 is obtained.

Figure 4:
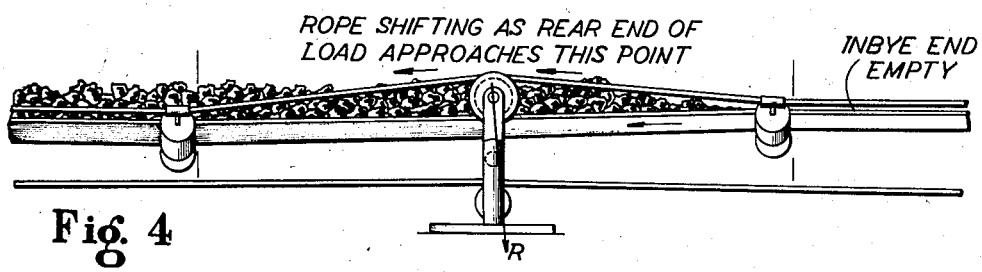
Figure 4 is a view similar to Figure 3 but showing the condition where the end of a load passes over the supporting stand.

Eventually the miner stops loading. As the belt continues to run, it progressively empties, lightening the load from the inby end, causing a shift of rope to the left as shown in Figure 4, until the maximum degree of shift occurs at the instant the end of the load passes over the stand. The resultant R will then be swung to the right, to its maximum right-hand condition, substantially as shown in Figure 4. However it will be observed that, again, R is well within the foot so as to represent another condition of stability.

Figure 5:
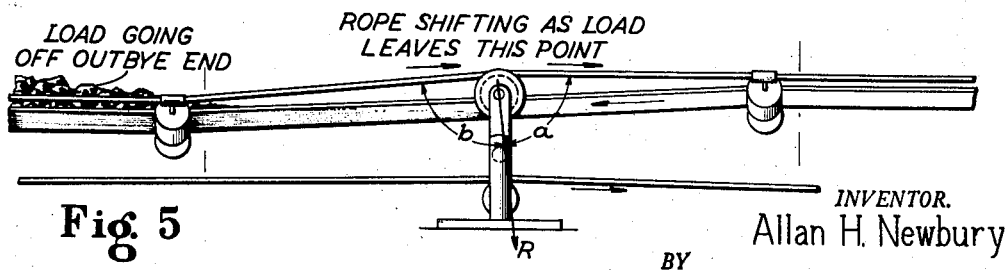
Figure 5 is a view similar to Figure 4, showing the condition as the load passes off of the belt.

As the belt continues to run, from the Figure 4 position, it empties the outby portion, progressively lightening it and progressively shifting rope back to the right as shown in Figure 5. When the load is run off and the belt is completely empty, the symmetrical condition of Figure 1 will be re-assumed.

While the belt is running as abovedescribed, the return reach 14 may be supported as shown on an idler 27 carried by the stand 16. A transverse strut or spacer 28 may be provided to maintain the legs 18, 18 rigidly spaced apart.

From the foregoing description, it has been demonstrated that great practical benefits result in providing a friction-free, or a substantially friction-free, guide or mounting device between the ropes and supporting stand of a rope side frame conveyor. The tendency of the stand to tip over, walk lengthwise of the conveyor, or slue sidewise with the consequent possible de-training of the belt has been completely eliminated by this improvement.

While two particular embodiments in which the present invention may be made have been shown and described, it will be understood that various other modifications and variations thereof may be effected without departing from the spirit and scope of the invention as defined by the appended claims.

I claim as my invention:

1. In a belt conveyor, a pair of laterally spaced generally parallel flexible strands; troughing assemblies spaced along said strands, spanning said strands and suspended therefrom; a conveyor belt longitudinally movable along said assemblies relative to said strands; strand supporting means spaced from the troughing assemblies along said strands, an anti-friction supporting connection between said supporting means and the respective strands enabling relative longitudinal shifting movement between the supporting means and the respective strands during the movement of the belt relative to the strands.

2. In a belt conveyor, a pair of laterally spaced generally parallel flexible strands; troughing assemblies spaced along said strands, spanning said strands and suspended therefrom; a conveyor belt longitudinally movable along said assemblies relative to said strands; strand supporting means longitudinally spaced from the troughing assemblies along said strands, and connecting means between said supporting means and said strands, said connecting means including anti-friction means enabling free relative longitudinal shifting movement between said supporting means and the respective strands during the movement of the belt relative to the strands.

3. In a belt conveyor, a pair of laterally spaced generally parallel flexible strands; troughing roller assemblies spaced along said strands, spanning said strands and suspended therefrom; a conveyor belt having the conveying reach thereof supported by and longitudinally movable along said roller assemblies relative to said strands; supporting means for said strands longitudinally spaced from the roller assemblies along said strands, connecting means between said supporting means and the respective strands, said connecting means comprising freely turning sheave means guiding the strands and enabling relative longitudinal shifting movement between the support means and the respective strands during the movement of the conveying reach of the belt relative to the strands.

4. In a belt conveyor, a pair of laterally spaced generally parallel flexible strands; troughing assemblies spaced along said strands, spanning said strands and suspended therefrom; a conveyor belt longitudinally movable along said assemblies relative to said strands; strand supporting means spaced from the troughing assemblies along said strands, said supporting means including a ground-engaging element, a pair of legs extending upwardly from the element, each leg having a supporting connection with one of said strands, each of said supporting connections comprising an anti-friction means enabling free relative longitudinal shifting movement between said supporting means and the respective strands during the movement of the belt relative to the strands.

5. In a belt conveyor, a pair of laterally spaced generally parallel flexible strands; troughing roller assemblies spaced along said strands, spanning said strands and suspended therefrom; a conveyor belt having the conveying reach thereof supported by and movable along said roller assemblies relative to the strands; supporting means for maintaining said strands at a predetermined height comprising a ground-engaging foot having upstanding legs, each of said legs having an anti-friction supporting connection with one of said strands, each of said supporting connections comprising an anti-friction means enabling free relative longitudinal shifting movement between said supporting means and the respective strands during the movement of the conveying reach of the conveyor belt relative to the strands, each strand exerting a downward resultant force on the respective leg along a line bisecting the angle formed by the respective strand at the respective connection, said foot extending on both sides of a vertical plane common to said connections, said foot being intersected by a second plane common to said lines of resultant force, said second plane being shiftable about said supporting connections to intersect first one side and then the other of said foot during the movement of the strands.

6. In a belt conveyor, a pair of laterally spaced generally parallel flexible strands fixed at their opposite ends, troughing assemblies attached at their opposite ends to and spanning the space between said strands at spaced intervals therealong, a conveyor belt movable longitudinally of and relative to said strands on said assemblies, supporting members at spaced intervals along the opposite sides of said belt in proximity to said strands, and a strand mounting device for each said supporting member attached thereto and having a strand-engaging portion in supporting engagement with the portion of the strand in proximity to said supporting member to mount each said strand for free longitudinal shifting movement relative to its supporting members.

7. In a belt conveyor as set forth in claim 6 wherein each said strand engaging portion is carried by its supporting member for movement relative thereto to enable the strand engaging said strand-engaging portion to freely shift longitudinally relative to said member.

8. In a belt conveyor as set forth in claim 6 wherein the supporting members along each side of said belt are fixed against movement relative to those along the other side of said belt in a direction transversely thereof and cooperate with the mounting devices to hold said strands in laterally spaced relationship from each other.

9. In a belt conveyor as set forth in claim 6 wherein spacer members extend between the supporting members along each side of said belt and those along the other side thereof, respectively, and fix said supporting members against relative movement transversely of said strands to maintain said strands in laterally spaced relationship.

10. In a belt conveyor, a pair of laterally spaced generally parallel flexible strands, troughing assemblies attached to and spanning the space between the strands, a conveyor belt movable longitudinally of and relative to said strands on said assemblies, supporting members positioned along the opposite sides of said belt in proximity to said strands, and a strand mounting device for each said supporting member attached thereto and having a strand engaging portion in supporting engagement with the portion of the respective strand in proximity to the supporting member to mount each said strand for free longitudinal shifting movement relative to the respective supporting member.

11. In a belt conveyor, a pair of laterally spaced generally parallel flexible strands; troughing roller assemblies spaced along said strands, spanning said strands and suspended therefrom; a conveyor belt having the conveying reach thereof supported by and longitudinally movable upon said roller assemblies relative to said strands; supporting means for said strands being longitudinally spaced along said strands from the roller assemblies, each supporting means comprising a base and a pair of strand guiding elements carried by said base and supporting the respective strands, said strand guiding elements being freely movable back and forth in the direction of the respective strands and enabling free longitudinal shifting movement of the strands relative to the base during the movement of the conveying reach of the belt relative to the strands.

References Cited in the file of this patent
UNITED STATES PATENTS 1,748,301     McKinlay _____ Feb. 25, 1930